United States Patent [19]

Lütjens et al.

[11] Patent Number: 5,227,430

[45] Date of Patent: Jul. 13, 1993

[54] MIXTURES OF POLYAMIDES AND SPECIAL POLYMERS CONTAINING PHENOL GROUPS

[75] Inventors: Holger Lütjens, Cologne; Karl-Erwin Piejko, Bergisch Gladbach; Rüdiger Plaetschke, Leverkusen, all of Fed. Rep. of Germany

[73] Assignee: Bayer Aktiengesellschaft, Leverkusen, Fed. Rep. of Germany

[21] Appl. No.: 692,497

[22] Filed: Apr. 29, 1991

[30] Foreign Application Priority Data

May 12, 1990 [DE] Fed. Rep. of Germany ....... 4015298

[51] Int. Cl.$^5$ .............................................. C08L 77/00
[52] U.S. Cl. ..................................... 525/183; 525/178
[58] Field of Search ................................ 525/183, 178

[56] References Cited

U.S. PATENT DOCUMENTS 4,221,700  9/1980  Minagawa et al. ................. 525/178

FOREIGN PATENT DOCUMENTS 0036391  9/1981  European Pat. Off. .
0147609  7/1985  European Pat. Off. .

*Primary Examiner*—Ana L. Carrillo
*Attorney, Agent, or Firm*—Connolly & Hutz

[57] ABSTRACT

The invention relates to compatible polymer mixtures of a polyamide and a special vinyl monomer containing copolymerized structural units of the bisphenol derivative type. The new mixtures are suitable for the production of thermoplastic molding compounds.

6 Claims, No Drawings

MIXTURES OF POLYAMIDES AND SPECIAL POLYMERS CONTAINING PHENOL GROUPS

This invention relates to compatible polymer mixtures of a polyamide and a special vinyl monomer containing copolymerized structural units of the bisphenol derivative type. The new mixtures are suitable for the production of thermoplastic molding compounds.

Thermoplastic polyamides are standard raw materials for various commercially available plastic articles. For certain modern applications, there is a need to improve certain properties of polyamide molding compounds. For example, it would be desirable on the one hand to influence the hydrophilicity of polyamides, so that for example they would absorb less water in use and would show improved dimensional stability, and on the other hand to improve the heat resistance of polyamide molding compounds and/or their elasticity for certain applications.

There are various known possibilities for reducing the water absorption capacity of polyamides, including for example the addition of known low molecular weight polyamide plasticizers. The disadvantage of these additives lies in their inadequate resistance to migration and in their excessive volatility. The heat resistance of polyamides can be improved, for example, by addition of polymers having a higher glass temperature than polyamides. However, this does presuppose adequate compatibility or coupling between the polymeric components. It is known that certain compatibilities with polyamide can be established by using polymers in which groups chemically reactive to polyamide are incorporated. Groups of this type, such as for example anhydride or carboxylic acid groups, lead to a reaction with polyamide and are known to promote compatibility. Disadvantages of such molding compounds may include a reduction in flow, poor processability in the melt, susceptibility to fish eye formation and degradation of the polyamides It has now been found that certain vinyl polymers containing certain structural units on the one hand show high compatibility with polyamides and on the other hand improve important practical properties of thermoplastic polyamides, such as their water absorption capacity for example, in correlation with a change in their physical properties, heat resistance and elasticity, depending on the overall chemical structure of the polymer B) mixed with the polyamide. The new mixtures are distinguished from known molding compounds by resistance to migration, a low content of volatile components, better flow and processing behavior and high resistance to ageing.

Accordingly, the present invention relates to compatible polymer mixtures of
A) 10 to 95 parts by weight and preferably 20 to 95 parts by weight of a thermoplastic polyamide and
B) 1 to 90 parts by weight and preferably 5 to 80 parts by weight of a vinyl monomer polymer containing structural units corresponding to formula (I)

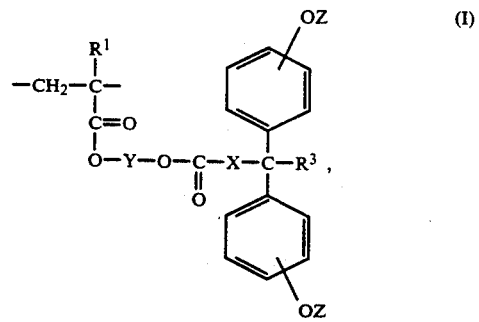

in which
$R^1$ = hydrogen, $C_{1-4}$ alkyl,
$R^2$ = $C_{1-12}$ alkyl (primary, secondary or tertiary),
$R^3$ = $C_{1-12}$ alkyl (primary, secondary or tertiary),
$X$ = $C_{1-12}$ alkylene,
$Y$ = $C_{1-12}$ alkylene,
$Z$ = hydrogen

Particularly suitable structural units (I) are those in which
$R^1$ = $CH_3$
$R^3$ = $CH_3$
$X$ = $-(CH_2)_2-$, $Y$ = $-(CH_2)_2-$ and $Z$ = H.

Monomers suitable for the synthesis of the polymers B) are partly known and have the following structure

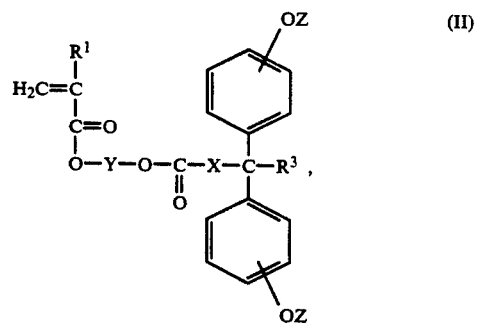

in which
$R^1$, $R^2$, $R^3$, $X$, $Y$ and $Z$ are as defined above. Polymers B) suitable for the purposes of the invention are either homopolymers consisting of structural units corresponding to formula (I) or polymers consisting of copolymerized units of monomers (II) and at least one monomer from the group consisting of ethylenically unsaturated copolymerizable compounds and more particularly from the group consisting of styrenes (α-methyl styrene, p-methyl styrene, halostyrene, methoxystyrene), acrylonitriles (acrylonitrile, methacrylonitrile), acrylates or methacrylates (more particularly $C_{1-8}$ alkyl (meth)acrylates), maleic imides, maleic anhydrides, acrylic acid, methacrylic acid, vinyl ethers, ethylene, propylene, butadiene, chloroprene.

Polymers B) suitable for the purposes of the invention are linear to slightly crosslinked polymers soluble in organic media and preferably having molecular weights Mw (weight average) of up to 500,000 and more particularly in the range from 10,000 to 100,000 (as determined by light scattering or sedimentation).

Polymers B) suitable for the purposes of the invention may be prepared in known manner by polymerization of the bisphenol derivatives corresponding to formula (II) and optionally the above-mentioned comonomers. The polymerization is preferably carried out as solution, suspension or emulsion polymerization and preferably in the presence of radical initiators. Suitable radical initiators are, for example, compounds containing azo groups, such as azoisobutyrodinitrile, 4,4-azo-bis-(4-cyanovaleric acid), organic peroxides, such as benzoyl peroxide, tert. butyl hydroperoxide, dibenzoyl peroxide, and inorganic peroxide salts, such as potassium peroxodisulfate, ammonium peroxodisulfate.

If polymerization is carried out in solution, solvents in which only the monomers are soluble or solvents in which the monomers and the polymers are soluble may be used. Suitable organic solvents are, for example, butanol, methyl ethyl ketone, ethyl benzene.

If polymerization is carried in (aqueous) emulsion, the monomers are best emulsified with emulsifiers, for example anionic, cationic or nonionic emulsifiers, for example with sodium, potassium, ammonium salts of fatty acids, sodium lauryl sulfate, the sodium salt of $C_{14-18}$ alkyl sulfonic acids, oleyl or octadecyl alcohol.

The polymerization is advantageously carried out at elevated temperature, for example at $+30°$ to $+90°$ C. and more particularly at $+60°$ to $+85°$ C.

For polymerization, the substituents Z in the bisphenol derivatives corresponding to formula (II) are preferably

These substituents may even remain intact during polymerization; free phenolic groups can inhibit the polymerization reaction. Strongly acidic (pH<1) and strongly alkaline (pH>12) media and relatively high temperatures should be avoided even in the case of emulsion polymerization. The polymerization is preferably carried out in mildly acidic or neutral medium.

The substituents

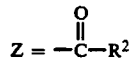

in the polymers B) suitable for the purposes of the invention can be hydrolyzed by bases, so that structural units corresponding to formula (I) in which Z=H are formed.

Hydrolysis may be carried out, for example, by initially adding a base to the polymerization mixture (for example the emulsion) on completion of polymerization without isolating the polymers, followed by prolonged heating at 30° to 95° C. and preferably at 50° to 90° C., for example for 3 hours to 3 days and preferably for 12 to 24 hours, and then isolating the polymers by coagulation or precipitation. Suitable bases are alkali metal hydroxides, for example potassium hydroxide, sodium hydroxide, ammonium hydroxide, quaternary ammonium bases, for example tetramethyl ammonium hydroxide, benzyl trimethyl ammonium hydroxide, and water-soluble amines, for example methyl amine, ethyl amine, dimethyl amine, diethyl amine, benzyl methyl amine.

The polyamide component A) of the molding compounds according to the invention may be selected from any partly crystalline polyamides, including in particular polyamide-6, polyamide-6,6, mixtures thereof, and partly crystalline copolyamides based on these two components. Other suitable polyamides are partly crystalline polyamides of which the acid component consists in particular completely or partly (in addition to adipic acid or caprolactam) of terephthalic acid and/or isophthalic acid and/or suberic acid and/or azelaic acid and/or dodecane dicarboxylic acid and/or adipic acid and/or a cyclohexane dicarboxylic acid and of which the diamine component consists completely or partly of, in particular, m- and/or p-xylylenediamine and/or hexamethylenediamine and/or 2,2,4- and/or 2,4,4-trimethyl hexamethylenediamine and/or isophoronediamine and of which the composition is known from the prior art.

Other suitable polyamides are partly crystalline polyamides produced completely or partly from $C_{6-12}$ lactams, optionally using one or more of the starting components mentioned above.

Particularly preferred partly crystalline polyamides A) are polyamide-6 and polyamide-6,6, mixtures thereof or copolyamides containing only small amounts (up to about 10% by weight) of the co-components.

Amorphous polyamides may also be used as the polyamide component A). They are obtained by polycondensation of diamines, for example ethylenediamine, hexamethylenediamine, decamethylenediamine, 2,2,4- and/or 2,4,4-trimethyl hexamethylenediamine, m- and/or p-xylylenediamine, bis-(4-aminocyclohexyl)-methane, or mixtures of 4,4'- or 2,2'-diaminodicyclohexyl methanes, 2,2-bis-(4-aminocyclohexyl)-propane, 3,3'-dimethyl-4,4'-diaminodicyclohexyl methane, 3-aminoethyl-3,5,5-trimethyl cyclohexyl amine, 2,5- and/or 2,6-bis-(aminomethyl)-norbornane and/or 1,4-diaminomethyl cyclohexane, with dicarboxylic acids, for example oxalic acid, adipic acid, azelaic acid, decane dicarboxylic acid, heptadecane dicarboxylic acid, 2,2,4- and/or 2,4,4-trimethyl adipic acid, isophthalic acid or small quantities of terephthalic acid. Amorphous copolymers obtained by polycondensation of several monomers are of course also suitable, as are copolymers prepared with addition of aminocarboxylic acids, such as ω-aminocaproic acid, ω-aminoundecanoic acid or ω-aminolauric acid or lactams thereof.

Particularly suitable amorphous polyamides are the polyamides prepared from isophthalic acid, hexamethylene-diamine and other diamines, such as 4,4'-diaminodicyclohexyl methane, isophoronediamine, 2,2,4- and/or 2,4,4-trimethyl hexamethylenediamine, 2,5- and/or 2,6-bis-(aminomethyl)-norbornane; or from isophthalic acid, 4,4'-diaminodicyclohexyl methane and ω-caprolactam; or from isophthalic acid, 3,3'-dimethyl-4,4'-diaminodicyclohexyl methane and lauric lactam; or from terephthalic acid and the isomer mixture of 2,2,4- and/or 2,4,4-trimethyl hexamethylenediamine.

Instead of using pure 4,4'-diaminodicyclohexyl methane, it is also possible to use mixtures of the positionisomeric diaminodicyclohexyl methanes which consist of
70 to 99 mol-% of the 4,4'-diamino isomer,
1 to 30 mol-% of the 2,4'-diamino isomer,
0 to 2 mol-% of the 2,2'-diamino isomer and, optionally, correspondingly more highly condensed diamines obtained by hydrogenation of the corresponding diaminodiphenyl methane isomers.

The polyamides A) may also consist of mixtures of partly crystalline and amorphous polyamides, the amorphous polyamide component preferably being smaller than the partly crystalline polyamide component.

Partly crystalline polyamides based on polyamide-6, polyamide-6,6 and partly crystalline polyamides based on these principal components with addition of co-components of the type mentioned are preferred.

The polyamides A) should preferably have a relative viscosity (as measured on a 1% by weight solution in m-cresol at 25° C.) of 2.0 to 5.0 and preferably 2.5 to 4.0.

Typical additives, such as lubricants and mold release agents, nucleating agents, stabilizers, fillers and reinforcing materials, flameproofing agents, dyes, pigments and heat stabilizers, antioxidants and/or light stabilizers, may also be added to the molding compounds according to the invention based on A)+B).

The molding compounds according to the invention may be produced by mixing the components in standard mixing units, such as mixing rolls, kneaders, single-screw or multiscrew extruders.

The temperature at which the mixtures are prepared should be at least 10° C. and best at most 80° C. above the melting point or softening point; in the case of non-crystalline materials, above the melting or softening point of the component with the highest melting or softening temperature. Commensurate with their property spectrum, the molding compounds according to the invention may be used for any applications in the injection molding and extrusion field where the described properties are required, for example in the automotive field (bumpers), in electrical engineering, in machine construction or in the building field.

EXAMPLES

1. Starting compounds

1.1 Component A

Polyamide-6 having a relative viscosity of 3.0 (as measured on a 1% by weight solution in m-cresol at 25° C.).

1.2 Component B

Vinyl monomer polymer of structural units corresponding to formula (Ia)

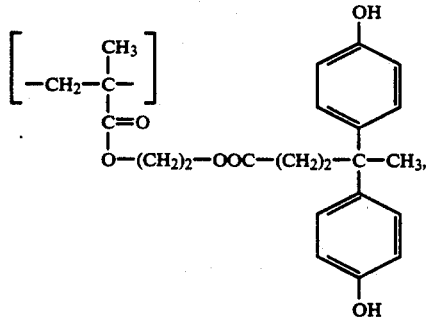

Preparation of the vinyl monomer polymer

To prepare the monomer used corresponding to formula (IIa)

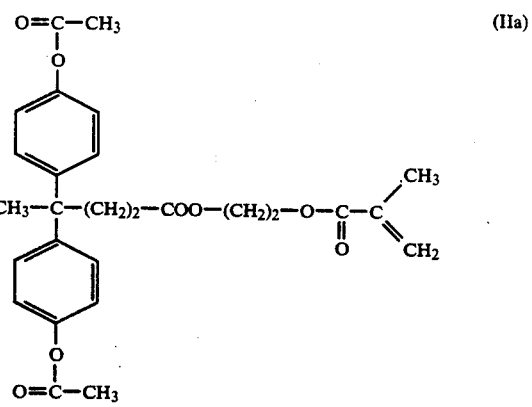

20 parts by weight of the monomer of formula (IIa) are emulsified in a solution of 0.4 part by weight of the sodium salt of $C_{14-18}$ alkyl sulfonic acids in 45 parts by weight water and, after the addition of 0.1 part by weight tert. dodecyl mercaptan, the resulting emulsion is heated to 75° C. After addition of 0.09 part by weight potassium peroxodisulfate, the emulsion is stirred for 10 hours at 75° C. A latex having a solids content of 30% is obtained.

6 Parts by weight concentrated aqueous ammonia solution (25%) are added to 50 parts by weight of the emulsion (solids content: 30%) and, after dilution with 70 parts by weight water, the reaction mixture is stirred for 18 hours at 70° C. The reaction mixture is then adjusted to pH 3 with dilute aqueous hydrochloric acid, the solid precipitated is filtered off, washed with water and dried. Yield: 11 parts by weight (90%).

IR (KBr): $\gamma=3650-3100$, 3000, 1740, 1620, 1600, 1510, 1440, 1240, 1180, 840 $cm^{-1}$.

2. Mixtures of component A and component B (invention)

To prepare the mixtures, the components are dissolved in m-cresol in the ratios by weight shown in the Table (5% solution). Films (50μm wet) are cast from the solutions and are dried in vacuo (1 mbar) at 80° C. to constant weight.

The mixtures thus prepared are analyzed by differential calorimetry with heating to 240° C. The positions of the glass and melt transitions of the mixtures are shown in the Table.

TABLE

| Glass and melt transitions of the polyamide-6/vinyl monomer polymer mixtures | | | | |
|---|---|---|---|---|
| Composition in % by weight | | | | |
| Examples | Component A Polyamide | Component B Vinyl monomer polymer | $T_G$ in °C. | $T_M$ in °C. |
| 2.1 | — | 100 | 106 | — |
| 2.2 | 20 | 80 | 89 | — |
| 2.3 | 40 | 60 | 89 | 200 |
| 2.4 | 60 | 40 | 88 | 215 |
| 2.5 | 80 | 20 | 87 | 220 |
| 2.6 (Comp.) | 100 | — | 50 | 220 |

$T_G$: Glass temperature
$T_M$: Melting temperature

It is clear from the position of the glass temperature and the absence of a melt transition of the mixture that 20% by weight polyamide-6 is entirely compatible with the vinyl monomer polymer B. A further addition of polyamide-6 results in partial separation through partial crystallization of the polyamide-6 (Examples 2.3–2.5). However, the amorphous phase of the mixtures of Examples 2.3 to 2.5 is again homogeneously mixed and contains substantially the same quantity of vinyl monomer polymer B, as can be seen from the similar position of the glass transition (T ~88° C.).

The addition of the vinyl monomer polymer B nevertheless leads to a distinct increase in the glass temperature of the amorphous phase of the polyamide-6 (see Examples 2.2–2.5 by comparison with Example 2.6).

We claim:

1. Compatible polymer mixtures comprising
   A) 10 to 95 parts by weight, based on the sum of A)+B), of a thermoplastic polyamide and
   B) 1 to 90 parts by weight, based on the sum of A)+B), of a vinyl monomer polymer containing structural units corresponding to formula (I)

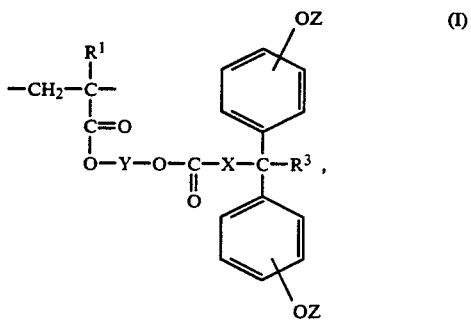

in which
$R^1$ = hydrogen or $C_{1-4}$ alkyl,
$R^2$ = $C_{1-12}$ alkyl,
$R^3$ = $C_{1-12}$ alkyl,
X = $C_{1-12}$ alkylene,
Y = $C_{1-12}$ alkylene, and
Z = hydrogen or

2. Compatible polymer mixtures according to claim 1 comprising,
   A) 20 to 95 parts by weight of a thermoplastic polyamide and
   B) 5 to 80 parts by weight of a vinyl polymer containing structural units corresponding to formula I.

3. Compatible polymer mixtures according to claim 1, in which the structure according to formula I is characterized by
   $R^1$ = $CH_3$
   $R^3$ = $CH_3$
   X = —$(CH_2)_2$—
   YH = —$(CH_2)_2$—, and
   Z = hydrogen.

4. Compatible polymer mixtures according to claim 1, wherein polymer A is based on semicrystalline polyamide-6, polyamide-6,6, mixtures thereof or copolyamides based on these two constituents.

5. Compatible polymer mixtures according to claim 3, wherein the amount of A) is 20 to 95 parts by weight and the amount of B) is 5 to 80 parts by weight.

6. Compatible polymer mixtures according to claim 5, wherein polymer A is a semicrystalline polyamide-6, polyamide-6,6, mixtures thereof or copolyamides of polyamide-6 and polyamide-6,6.

* * * * *

UNITED STATES PATENT AND TRADEMARK OFFICE
CERTIFICATE OF CORRECTION

PATENT NO.  : 5,227,430
DATED       : July 13, 1993
INVENTOR(S) : Lütjens et al.

It is certified that error appears in the above-identified patent and that said Letters Patent is hereby corrected as shown below:

TITLE PAGE

The "Foreign Patent Documents" subsection of the "References Cited" section of the above-identified patent should read as follows:

FOREIGN PATENT DOCUMENTS 0036301  9/1981  European Pat. Off.
0147609  7/1985  European Pat. Off.

Column 8, claim 3, line 23, should be corrected to read
-- $Y = -(CH_2)_2-$, and --.

Signed and Sealed this

Twenty-ninth Day of March, 1994

Attest:

BRUCE LEHMAN

*Attesting Officer*   Commissioner of Patents and Trademarks